United States Patent
Lu

(10) Patent No.: US 9,716,351 B2
(45) Date of Patent: Jul. 25, 2017

(54) PLUG WITH OVERHEAT WARNING DEVICE HAVING A TEMPERATURE SENSOR, A CONTROL BOARD AND AN ALARM GENERATOR

(71) Applicant: Dong Guan Song Wei Electric Technology Co., Ltd., Dongguan (CN)

(72) Inventor: Weilin Lu, Dongguan (CN)

(73) Assignee: DONG GUAN SONG WEI ELECTRIC TECHNOLOGY CO., LTD., Dongguan, Guangdong (CN)

( * ) Notice: Subject to any disclaimer, the term of this patent is extended or adjusted under 35 U.S.C. 154(b) by 0 days.

(21) Appl. No.: 15/227,969

(22) Filed: Aug. 4, 2016

(65) Prior Publication Data
US 2017/0141519 A1    May 18, 2017

(30) Foreign Application Priority Data
Nov. 16, 2015 (CN) .......................... 2015 1 0781304

(51) Int. Cl.
| H01R 13/66 | (2006.01) |
| H01R 13/717 | (2006.01) |
| H01R 24/28 | (2011.01) |
| H01R 103/00 | (2006.01) |

(52) U.S. Cl.
CPC ..... H01R 13/7175 (2013.01); H01R 13/6666 (2013.01); H01R 13/6683 (2013.01); H01R 13/6691 (2013.01); H01R 24/28 (2013.01); H01R 2103/00 (2013.01)

(58) Field of Classification Search
CPC .. H01R 9/2425; H01R 9/2433; H01R 9/2441; H01R 13/66; H01R 13/6666; H01R 13/6675; H01R 13/6683; H01R 13/6691; H01R 13/68; H01R 13/6658; H01R 13/7175; H01R 24/28
USPC ............. 439/620.01, 620.08, 620.21, 620.22
See application file for complete search history.

(56) References Cited

U.S. PATENT DOCUMENTS

| 3,872,355 | A * | 3/1975 | Klein | G08B 17/06 307/117 |
| 5,600,306 | A * | 2/1997 | Ichikawa | H01R 13/7137 337/1 |
| 8,325,454 | B2 * | 12/2012 | Brugner | H01R 13/6683 361/103 |
| 8,902,555 | B2 * | 12/2014 | Cheng | H01R 13/7137 361/103 |
| 9,564,718 | B2 * | 2/2017 | Li | H01R 24/78 |
| 2005/0089079 | A1 * | 4/2005 | Engel | G01K 3/14 374/141 |
| 2009/0251832 | A1 * | 10/2009 | Brugner | H01R 13/6683 361/42 |

* cited by examiner

Primary Examiner — Chandrika Prasad
(74) Attorney, Agent, or Firm — Leong C. Lei

(57) ABSTRACT

The plug with overheat warning device includes a main member, prongs, and an overheat warning device. The prongs are extended from within the main member towards and outside of a front side of the main member. The overheat warning device is housed inside the main member. The overheat warning device includes a control board, a temperature sensor, and an alarm generator. The control board is configured with a power circuit, a temperature sensing circuit, and an alarm control circuit.

10 Claims, 3 Drawing Sheets

PLUG WITH OVERHEAT WARNING DEVICE HAVING A TEMPERATURE SENSOR, A CONTROL BOARD AND AN ALARM GENERATOR

BACKGROUND OF THE INVENTION (a) Technical Field of the Invention

The present invention is generally related to electrical plugs, and more particular to a plug equipped with an overheat warning device.

(b) Description of the Prior Art

Electrical plugs are joined to sockets so as to achieve electrical connection for the provision of electricity. In practical applications, poor contact is not uncommon and, when there is poor contact, temperature rises and the plug may be damaged or even burnt down by overheating. Therefore, there is a need for real-time monitoring plug's temperature so as to detect overheating as early as possible, to resolve the poor contact in time, and to prevent safety accident from happening.

SUMMARY OF THE INVENTION

Therefore, to obviate the shortcoming of the prior art, a major objective of the present invention is to provide a plug with an overheat warning device detecting the temperature inside the plug and issuing real-time alarm so as to prevent fire. The plug has simplified structure and production, and all is required is to configure the overheat warning device into the plug. The electricity provision to the overheat warning device is also drawn from within the plug, which is convenient and flexible for various applications.

To achieve the objective, the present invention adopts the following technical solution.

The plug includes a main member, at least a prong, and an overheat warning device. The prong is extended from within the main member to outside of the main member. The overheat warning device is housed inside the main member, and includes a control board, a temperature sensor connected to the control board, and an alarm generator. The control board includes a power circuit, a temperature sensing circuit, and an alarm control circuit. The power circuit provides electricity to the temperature sensing circuit and the alarm control circuit. The temperature sensor is connected to the temperature sensing circuit, and the alarm generator is connected to the alarm control circuit.

The temperature sensor detects temperature inside the main member and varies correspondingly a resistance; and the temperature sensor passes a resistance signal to the temperature sensing circuit and then to the alarm control circuit so as to activate the alarm generator to issue alarms.

Compared to the prior art, the gist of the present invention lies in the configuration of an overheat warning device directly inside the plug which utilizes a temperature sensor to detect the temperature inside the plug's main member and to provide a resistance value corresponding to the temperature variation. The resistance signal is then passed to the temperature sensing circuit and then to the alarm control circuit so as to drive the alarm generator to issue alarms and to prevent a fire.

Especially, the plug's structure and production are both very simple where the overheat warning device is configured inside the plug, and its power is also drawn directly from within the plug. Signal transmission is not through wired connections, but is directly transmitted, feed-backed, and controlled through the control board. Alarm detection is more precise and the plug is more convenient to produce and applied.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
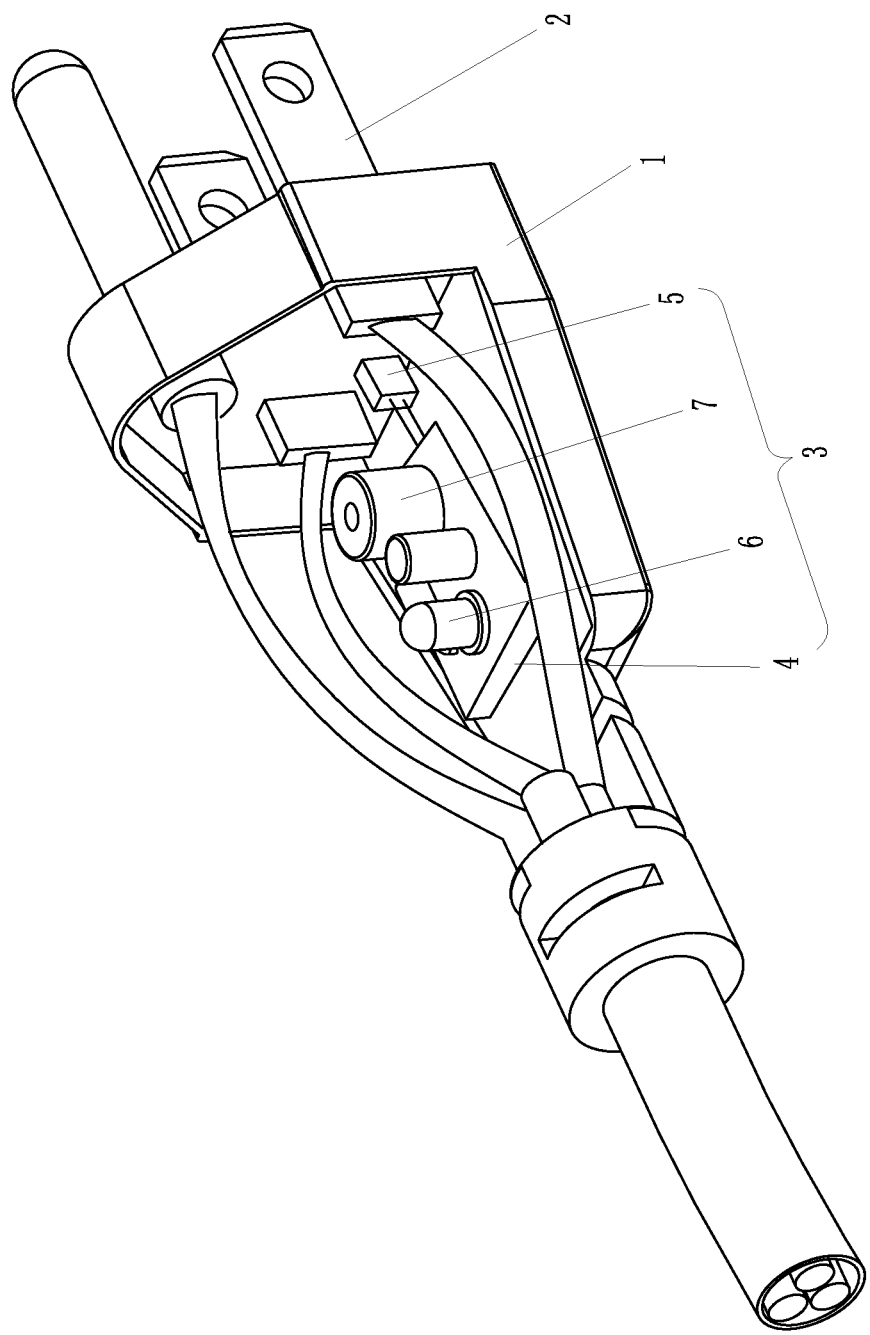
FIG. 1 is a perspective schematic diagram showing a plug with an overheating device according to an embodiment of the present invention.
Figure 2:
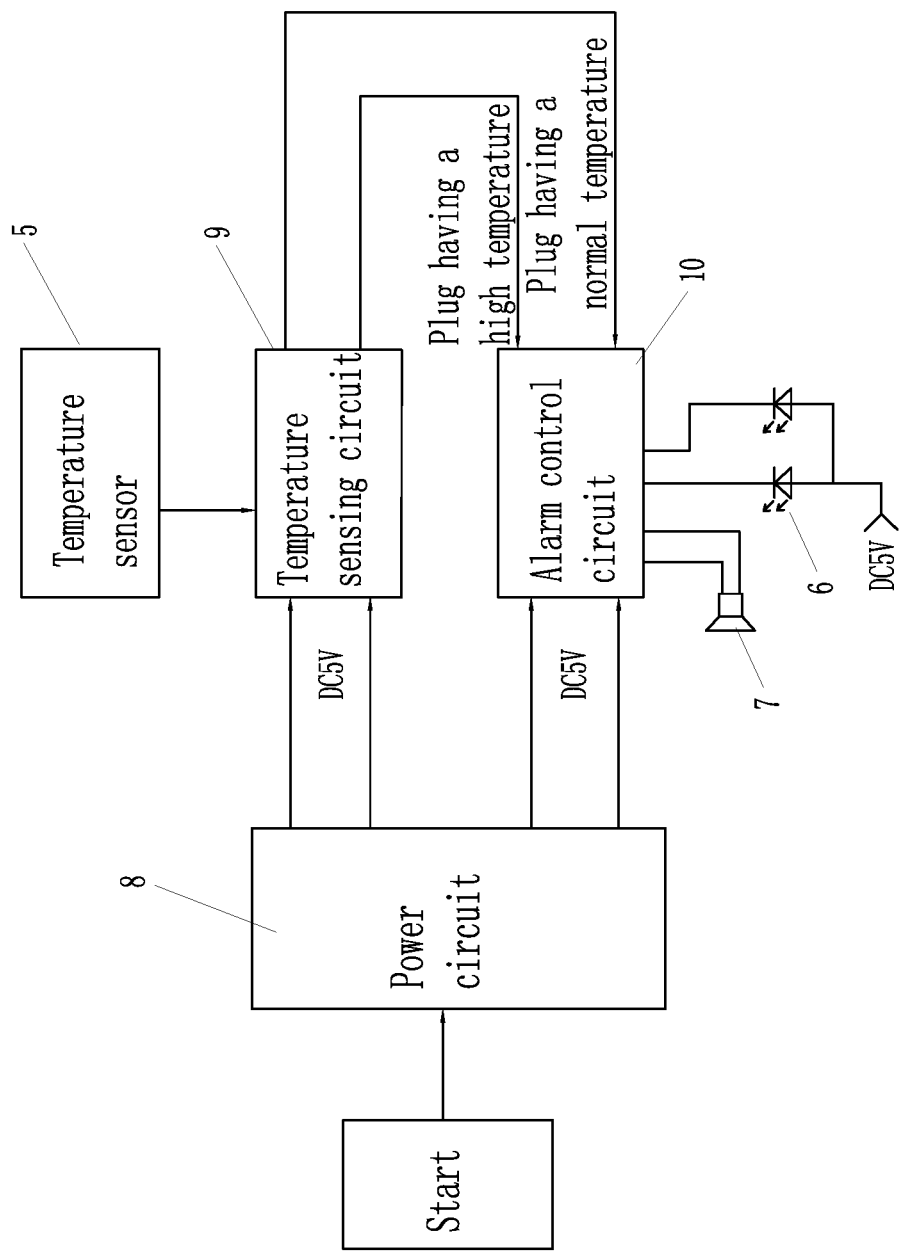
FIG. 2 is a functional block diagram showing the plug of FIG. 1.
Figure 3:
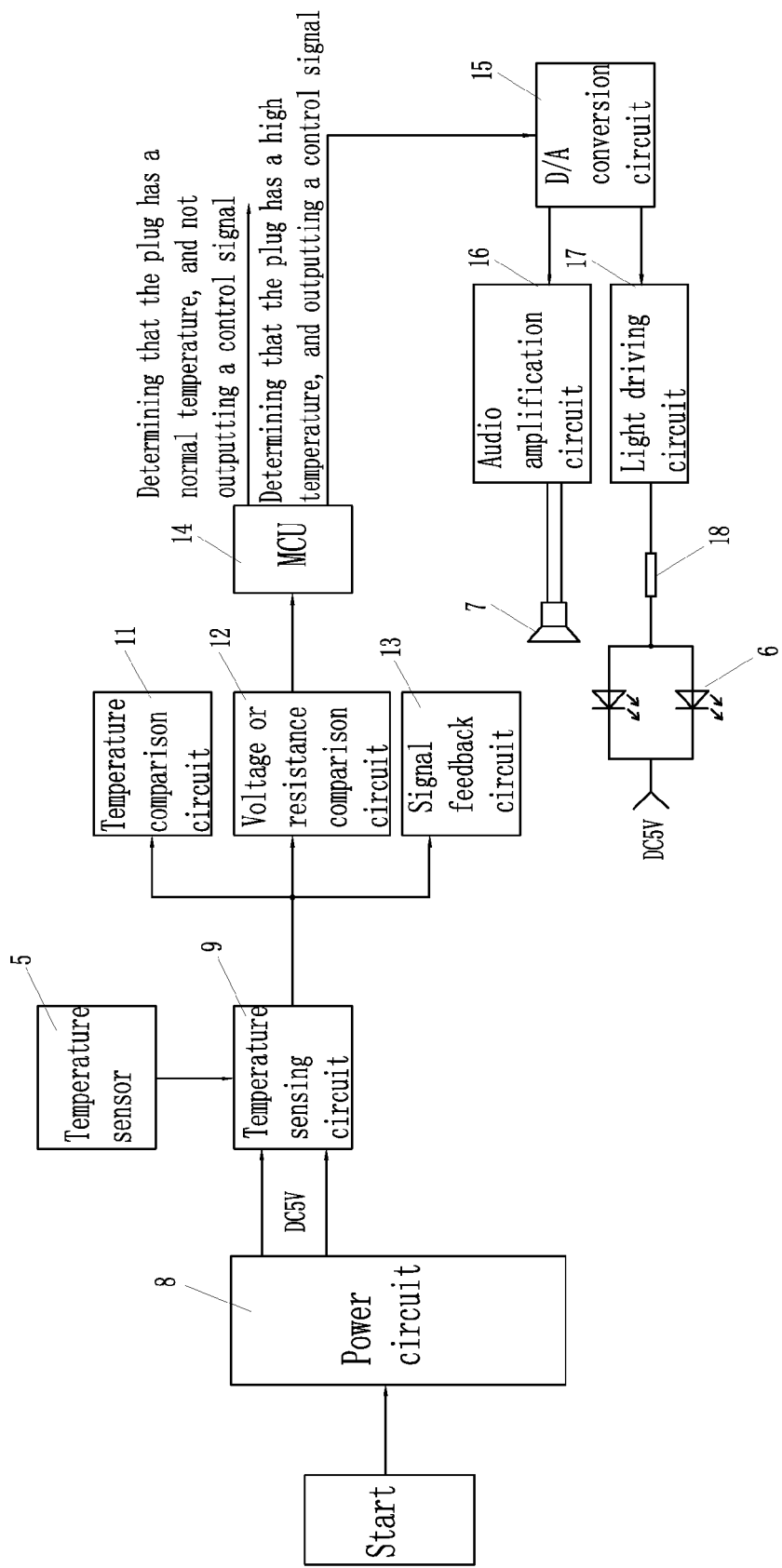
FIG. 3 is a functional block diagram providing more details of the plug of FIG. 2.

As shown in FIGS. 1 to 3, a plug with overheat warning device according to an embodiment of the present invention includes a main member 1, prongs 2, and an overheat warning device 3. The prongs 2 are extended from within the main member 1 towards and outside of a front side of the main member 1. The overheat warning device 3 is housed inside the main member 1. Usually there are two or more prongs 2. In other words, there may be two, three, or even more prongs 2.

The overheat warning device 3 includes a control board 4, a temperature sensor 5 connected to the control board 4, and an alarm generator. On the control board 4, there are a power circuit 8, a temperature sensing circuit 9, and an alarm control circuit 10. The temperature sensor 5 is surface-mounted or in-lined and soldered to the control board 4. The power circuit 8 provides a low-level DC voltage (e.g., DC3V-DC12V) to the temperature sensing circuit 9 and the alarm control circuit 10. The temperature sensor 5 is connected to the temperature sensing circuit 9. The alarm generator is connected to the alarm control circuit 10.

The temperature sensor 5 detects temperature inside the main member 1 and varies correspondingly a resistance. A resistance signal is then passed to the temperature sensing circuit 9 and to the alarm control circuit 10, so as to activate the alarm generator to issue alarms.

In the present embodiment, a comparison circuit is connected between the temperature sensing circuit 9 and the alarm control circuit 10. The comparison circuit includes a temperature comparison circuit 11, a voltage or resistance comparison circuit 12, and a signal feedback circuit 13. The alarm control circuit 10 includes a micro control unit (MCU) 14 and a digital-to-analog (D/A) conversion circuit 15. The comparison circuit's signal is passed to the MCU 14. The MCU 14 then passes the signal to the D/A conversion circuit 15.

The alarm generator includes indicator lights 6 and an audio signaling device 7. The D/A conversion circuit 15 includes an audio amplification circuit 16 and a light driving circuit 17. The audio signaling device 7 is connected to the audio amplification circuit 16, and the indicator lights 6 is connected to the light driving circuit 17. The MCU 14 may also deliver signal directly to the indicator lights 6 and/or the audio signaling device 7. Alternatively, the alarm control circuit 10 also includes the MUC 14, and the audio amplification circuit 16 and the light driving circuit 17 are integrated inside the MCU 14. Usually the indicator lights 6 are light emitting diodes (LEDs). There may be one or more LEDs in parallel connection. A current-limiting resistor 18 is connected between the LEDs and the light driving circuit 17. The audio signaling device 7 may be a speaker or a buzzer.

The operation of the plug is described as follows.

The temperature sensor 5 continuously monitors the temperature inside the main member 1. The temperature sensor 5 may directly contacts the portions of the prongs 2 inside the main member 1. The resistance signal of the temperature sensor 5 is delivered in real-time to the temperature sensing circuit 9. When the temperature of the plug is too high, the temperature sensing circuit 9 sends a signal to the alarm control circuit 10 so as to trigger an audible or visual alarm to alert people to pull the plug and prevent a fire.

The gist of the present invention lies in the configuration of an overheat warning device directly inside a plug which utilizes a temperature sensor to detect the temperature inside the plug's main member and to provide a resistance value corresponding to the temperature variation. The resistance signal is then passed to the temperature sensing circuit and then to the alarm control circuit so as to drive the alarm generator to issue alarms and to prevent a fire. The plug's structure and production are both very simple where the overheat warning device is configured inside the plug, and its power is also drawn directly from within the plug. Signal transmission is not through wired connections, but is directly transmitted, feed-backed, and controlled through the control board. Alarm detection is more precise and the plug is more convenient to produce and applied.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A plug, comprising
   a main member;
   at least a prong extended from within the main member to outside of the main member; and
   an overheat warning device inside the main member, comprising a control board, a temperature sensor connected to the control board, and an alarm generator, where the control board comprises a power circuit, a temperature sensing circuit, and an alarm control circuit; the power circuit provides electricity to the temperature sensing circuit and the alarm control circuit; the temperature sensor is connected to the temperature sensing circuit; and the alarm generator is connected to the alarm control circuit;
   wherein the alarm generator comprises an indicator light inside the main member;
   the temperature sensor detects a temperature inside the main member, varies a resistance accordingly, and passes a resistance signal corresponding to the temperature to the temperature sensing circuit; and, when the temperature is too high, the temperature sensing circuit then sends a signal to the alarm control circuit to activate the indicator light.

2. The plug according to claim 1, wherein the alarm generator further comprises an audio signaling device; and the alarm control circuit also activates the audio signaling device.

3. The plug according to claim 2, wherein a comparison circuit is connected between the temperature sensing circuit and the alarm control circuit; the comparison circuit comprises a temperature comparison circuit, a voltage or resistance comparison circuit, and a signal feedback circuit.

4. The plug according to claim 3, wherein the alarm control circuit comprises a micro control unit (MCU) and a digital-to-analog (D/A) conversion circuit; the comparison circuit delivers a signal to the MCU; the MCU then passes the signal to the D/A conversion circuit; the D/A conversion circuit comprises an audio amplification circuit and/or a light driving circuit; the audio signaling device is connected to the audio amplification circuit; and the indicator light is connected to the light driving circuit.

5. The plug according to claim 3, wherein the alarm control circuit comprises a micro control unit (MCU); the comparison circuit delivers a signal to the MCU; the MCU then passes the signal to an audio amplification circuit and/or a light driving circuit; the audio signaling device is connected to the audio amplification circuit; and the indicator light is connected to the light driving circuit.

6. The plug according to claim 5, wherein the audio amplification circuit and the light driving circuit are integrated inside the MCU.

7. The plug according to claim 2, wherein each indicator light is a light emitting diode (LED); and the audio signaling device is a speaker or a buzzer.

8. The plug according to claim 7, wherein there is one or more LEDs in parallel connection; and a current-limiting resistor is connected between the LEDs and the light driving circuit.

9. The plug according to claim 1, wherein the temperature sensor is surface-mounted or in-lined, and soldered to the control board.

10. The plug according to claim 1, wherein there are two or more prongs.

* * * * *